(12) United States Patent
Bertrand et al.

(10) Patent No.: US 6,442,219 B1
(45) Date of Patent: Aug. 27, 2002

(54) SIMULTANEOUS DECODING AND PHASE SYNCHRONIZATION USING THE CRITERION OF MAXIMUM LIKELIHOOD

(75) Inventors: Cyril Bertrand; Fabien Buda; Emmanuel Lemois, all of Paris (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/284,874

(22) PCT Filed: Aug. 24, 1998

(86) PCT No.: PCT/FR98/01842

§ 371 (c)(1),
(2), (4) Date: Jun. 4, 1999

(87) PCT Pub. No.: WO99/11041

PCT Pub. Date: Mar. 4, 1999

(30) Foreign Application Priority Data

Aug. 26, 1997 (FR) .............................. 97 10667

(51) Int. Cl.[7] .......................... H03D 1/00; H04L 27/06
(52) U.S. Cl. ....................... 375/341; 714/794
(58) Field of Search ................ 375/316, 340, 375/341, 262; 714/790, 794, 795, 796

(56) References Cited

U.S. PATENT DOCUMENTS

| | | | | |
|---|---|---|---|---|
| 4,583,078 A | * | 4/1986 | Shenoy et al. ............... | 341/51 |
| 5,414,738 A | * | 5/1995 | Bienz ......................... | 375/341 |
| 5,619,167 A | * | 4/1997 | Adachi ....................... | 329/304 |
| 5,654,667 A | * | 8/1997 | Adachi ....................... | 329/306 |
| 5,684,832 A | * | 11/1997 | Adachi et al. ............... | 29/306 |
| 6,233,290 B1 | * | 5/2001 | Raphaeli | |

FOREIGN PATENT DOCUMENTS

| | | |
|---|---|---|
| EP | 0 671 837 A1 | 9/1995 |
| EP | 0 716 527 A1 | 6/1996 |
| EP | 0 723 353 A1 | 7/1996 |

OTHER PUBLICATIONS

S. Nassar, "Data Detection of MPSK in the presence of rapidly changing carrier phase", IEEE Transactions on Vehicular Technology, vol. 45, No. 3, Aug. 1996, pp. 484–490, XP000632293, New York, US.

S Divsalar, "Maximum–likelihood differential detection of uncoded and trellis coded amplitude phase modulation over AWGN and fading channels—metrics and performance", Electronics & Communications in Japan—Part I Communications, vol. 79, No. 1, Jan. 1996, pp. 82–96, XPO000553793.

S. Mutsumu et al, "Phase–tracking Viterbi demodulator" Electronics & Communications in Japan, Part I—Communications, vol. 79, No. 1, Jan. 1996, pp. 82–96, XP000553793.

* cited by examiner

Primary Examiner—Stephen Chin
Assistant Examiner—Lenny Jiang
(74) Attorney, Agent, or Firm—Sughrue Mion, PLLC

(57) ABSTRACT

A method of simultaneous phase synchronization and decoding that makes use of the maximum likelihood criterion is provided. The method is applied to signal packets received at a receiver, wherein the signals have been subjected to convolution encoding at the transmitter. The method consists of calculating branch metrics taking account firstly of firm decisions calculated on the received symbols and secondly of a magnitude that takes account of the phase error between the carrier of the signal and the local oscillator signal used at the receiver, the magnitude weighting the decision variables constituted by the complex digital components of the received symbols. This magnitude is equal to $\Sigma^*_k$ for each of the paths studied where:

$$\Sigma_k = \Sigma^N_{n=0} r_{k-n} \cdot d^*_{k-n}.$$

15 Claims, 4 Drawing Sheets

FIG_3A

| SY0 | SY1 | SY2 | SY3 | SY4 |
|---|---|---|---|---|
| b0, b1 | b2, ~~b3~~ | b4, b5 | b6, ~~b7~~ | b8, b9 |

FIG_3B

| SY0 | SY1 | SY2 | SY3 | SY4 |
|---|---|---|---|---|
| t0, t1 | t2, 0 | t4, t5 | t6, 0 | t8, t9 |

FIG_3C

| SY0 | SY1 | SY2 | SY3 | SY4 |
|---|---|---|---|---|
| b0, b1 | b2, b3 | b4, b5 | ~~b6~~, ~~b7~~ | b8, b9 |

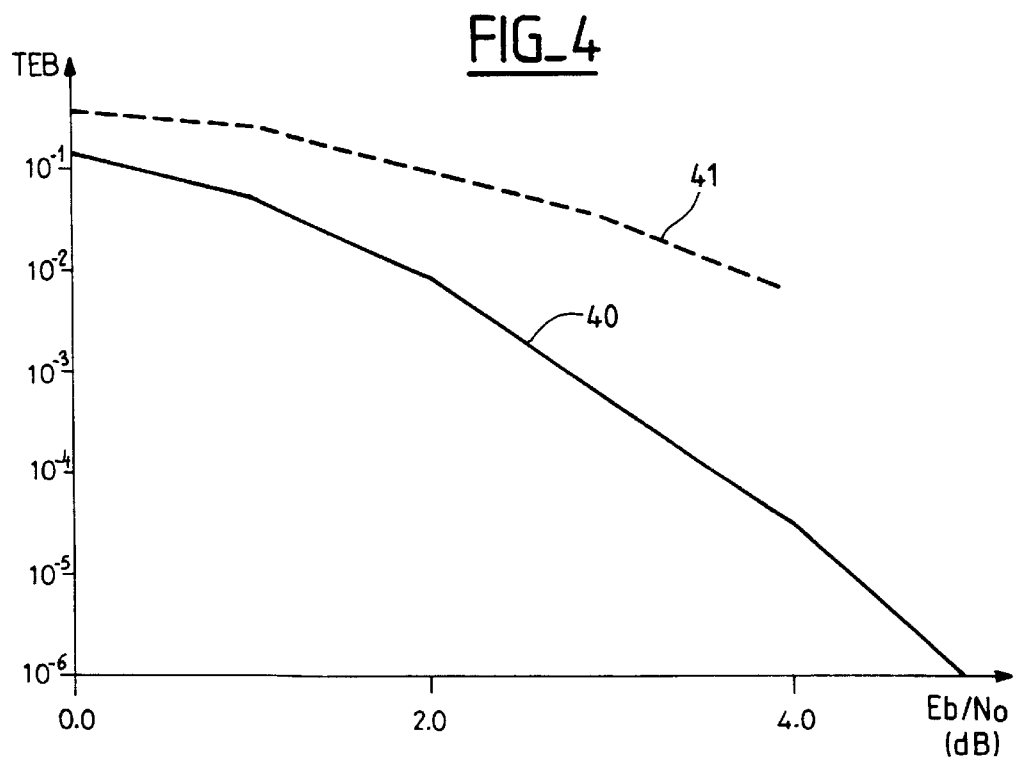
FIG_4
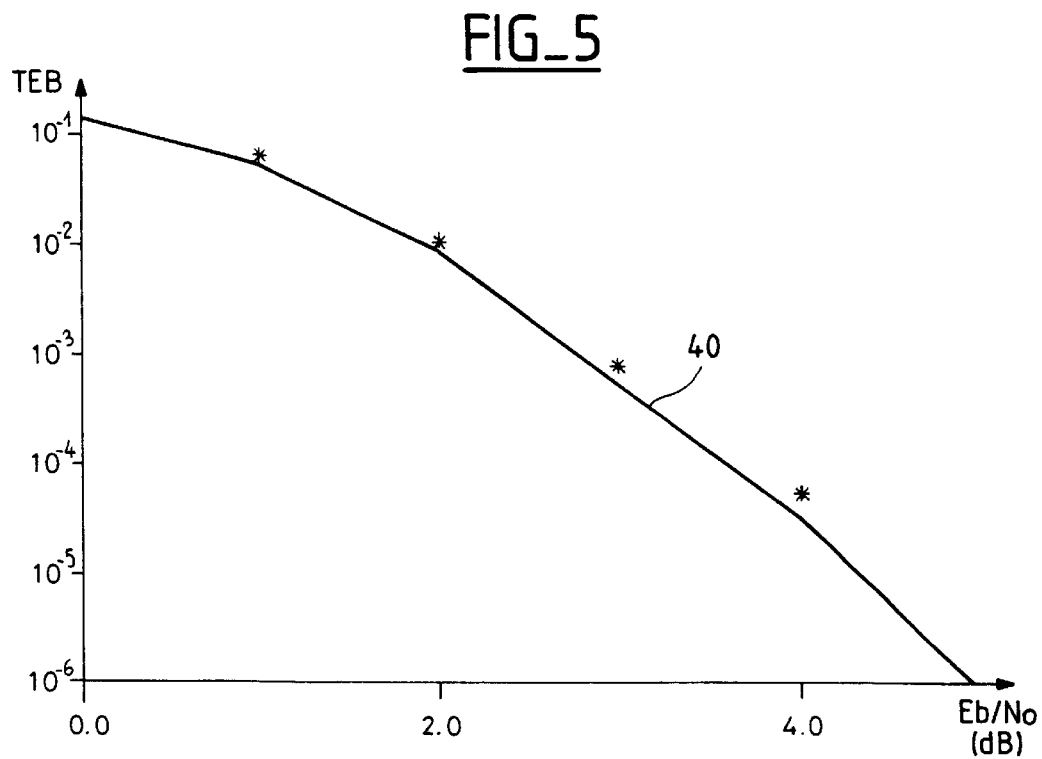
FIG_5

SIMULTANEOUS DECODING AND PHASE SYNCHRONIZATION USING THE CRITERION OF MAXIMUM LIKELIHOOD

BACKGROUND OF THE INVENTION

The field of the invention is that of receivers for digital signals transmitted in the form of packets. More particularly, the present invention relates to a method and apparatus applied to simultaneous phase synchronization and decoding of received packets, said phase synchronization and decoding making use of the maximum likelihood criterion implemented in the Viterbi algorithm.

The invention applies in particular to receiving short packets transmitted by satellite. In such a transmission system the signal-to-noise ratio (S/N) can be very low: the bit energy to noise ratio Eb/No on a channel (or as transmitted, i.e. after encoding) is of the order of 0 or 1 dB. In conventional convolutive encoding, this represents an efficiency of ½ compared with the theoretically available Eb/No ratio which is of the order of 3 to 4 dB. In addition, observed frequency differences $\Delta f$ relative to symbol time Ts ($\Delta f.Ts$), i.e. observed differences in frequency between the carrier of the signal as received and that of the local oscillator of the receiver relative to symbol time, are conventionally of the order of $10^{-2}$ to $10^{-3}$.

Such packets are usually decoded by means of a receiver system as shown in FIG. 1.

The received packets are applied to a quadrature demodulator 10 that also receives a local oscillator signal OL. The demodulator 10 supplies a baseband signal to an analog-to-digital converter 11 followed by a prefilter 12. The signal output from the prefilter 12 is applied simultaneously to a clock estimator 13 and to a filter 14 having a finite impulse response. The symbols from the filter 14 are then applied to a frequency estimator 15 which eliminates the residual frequency difference, said frequency estimator being followed by a phase estimator 16 that corrects the phase of the received signal. The phase estimator 16 may, for example, be a Viterbi and Viterbi estimator. Finally the decided bits are output by a decoder operating using the criterion of maximum likelihood, typically a Viterbi decoder 17.

The problem raised by a receiver system of that type is that the time required to acquire phase and frequency synchronization is long if phase and frequency estimating is performed on a plurality of packets (e.g. for a transmitted data rate of 25 kbauds/s and $\Delta f$ of 600 Hz). This is particularly true when access packets are spaced apart in time and of long duration, as during call setup.

Furthermore, a system of that type operates in tracking mode, i.e. when $\Delta f.Ts$ is about $10^{-3}$, it has a binary error rate (BER) that is about 1.5 dB less good than the theoretical BER, which constitutes a severe penalty in satellite transmission since it makes it necessary to increase transmitter power at the satellite. This drawback is associated with the short duration of the packets, e.g. about 128 symbols, together with thermal noise and lack of phase coherence between successive packets (phase noise).

This problem, associated with the inability of frequency estimators 15 and of phase estimators 16 to provide sufficient phase correction on received symbols, has been solved by integrating the block 16 in the Viterbi decoder 17 for estimating phase and by eliminating the frequency estimator. Such integration is described with reference to FIG. 2 which shows a decision-making step as conventionally implemented in a Viterbi decoder.

In this figure, $r_k$ corresponds to a received complex decision variable, e.g. expressed on 6 bits (3 bits for each of the components P and Q of the symbol under consideration), k responding to the symbol being decoded, $\lambda_0$ and $\lambda_1$ corresponding to two calculated metrics, and $b_k$ is the bit corresponding to the decoding symbol $d_k$.

Conventionally, the metric $\lambda$ is equal to:

$$\lambda = \|r_k - d_k\|^2$$

The solution enabling the phase of $r_k$ to be corrected in the Viterbi decoder consists in estimating phase over all of the previously received symbols. This estimation consists more precisely in calculating the following values:

$$Arg\left(\sum_{k=0}^{N} r_{k-n} \cdot d^*_{k-n}\right)$$

where Arg is the argument and N is the number of symbols participating in phase estimation.

This provides a mean value for the phase which is written $\phi_k$. The following step then consists in correcting the metric $\lambda$ by calculating:

$$\lambda = \|r_k \cdot e^{-j\phi_k} - d_k\|^2$$

The value of $\lambda$ then takes account of phase error in the received symbol. This type of phase correction makes it possible to improve performance in terms of acquisition and tracking quite perceptibly. In addition, the modified Viterbi algorithm is very robust against phase noise and large frequency differences $\Delta f.Ts$.

However, the problem raised by that known solution is that in order to calculate $$\sum_{n=0}^{N} r_{k-n} \cdot d^*_{k-n}$$

it is necessary to calculate a sliding window. That is complex to implement. In addition, extracting the argument consumes a large amount of calculation power. Finally, that decoding method is not compatible with a coding rate other than ½, e.g. with a punctured code of the ¾ or ⅘ type (generally of efficiency 1/(1+1)).

A particular object of the present invention is to remedy those drawbacks.

SUMMARY OF THE INVENTION

More precisely, an object of the invention is to provide a method and apparatus for simultaneous phase synchronization and decoding that makes use of the criterion of maximum likelihood which is easy to implement, which does not require long calculation time, and which can be compatible with any coding rate.

These objects and others that appear below are achieved by a method of simultaneous phase synchronization and decoding that makes use of the maximum likelihood criterion, the method being applied to signal packets received at a receiver, the received signals having been subjected to convolution encoding at a transmitter, the method consisting in calculating branch metrics taking account firstly of firm decisions calculated on the received symbols and secondly of a magnitude that takes account of phase error between the carrier of the received signal and the local oscillator signal used in the receiver, the magnitude weighting the decision variables constituted by the complex digital components of the received symbols, the method being characterized in that the magnitude is equal to $\Sigma^*_k$ for each of the paths studied, where $$\Sigma_k = \sum_{n=()}^{N} r_{n-k} d^*_{k-n}$$

r designating a received complex decision variable;
d designating the decoding symbol;
( )* designating the complex conjugate symbol of a complex value;
k designating the current decoded symbol; and
N the number of symbols taken into consideration.

Advantageously, the values of the branch metrics are:

$$\lambda_k = (\Sigma_k^* \cdot r_k) \cdot d_k + (\Sigma_k^* \cdot r_k)^* \cdot d_k$$

In a preferred implementation, the magnitude $\Sigma_k$ is replaced by $S_k$ where $S_k$ is given by:

$$S_k = \alpha \cdot S_{k-1} + r_k \cdot d_k^*$$

with $S_0=0$ and $\alpha$ equals a positive constant less than 1.

In another preferred implementation, in order to obtain a metric modulus that is statistically constant for decoding the first symbols of said received packets, said magnitude $\Sigma_k$ is replaced by $S_k/(1-\alpha^k)$, where $S_k$ is given by:

$$S_k = \alpha \cdot S_{k-1} + r_k \cdot d_k^*$$

with $S_0=0$ and $\alpha$ equals a positive constant less than 1.

Advantageously, the received signals are subjected to puncturing at symbol level, said puncturing having an efficiency of $1/(l+1)$, for example.

The method of the invention is advantageously applied to the phase-tracking stage in the receiver and can equally or additionally be applied to the phase acquisition stage.

Each packet preferably comprises a header comprising a single word.

The invention also provides an apparatus for simultaneous phase synchronization and decoding making use of the maximum likelihood criterion, the apparatus being designed to receive signal packets transmitted by a transmitter, the received signals having been subjected to convolution encoding at the transmitter, the apparatus comprising means for calculating branch metrics taking account firstly of firm decisions calculated on the received signals and secondly of a magnitude taking account of the phase error between the carrier of the received signal and the local oscillator signal used at the receiver, the magnitude weighting the decision variable constituted by the complex digital components of the received symbols, the apparatus being characterized in that the magnitude is equal to $\Sigma^*_k$ for each of the paths studied, where:

$$\Sigma_k = \sum_{n=()}^{N} r_{k-n} d^*_{k-n}$$

r designating a received complex decision variable;
d designating the decoding symbol;
( )* designating the complex conjugate symbol of a complex value;
k designating the current decoded symbol; and
N the number of symbols taken into consideration.
* designating the complex conjugate, k the current decoded symbol, and N the number of symbols taken into consideration.

Advantageously, the apparatus includes means for calculating the values of the branch metrics, supplying:

$$\lambda_k = (\Sigma_k^* \cdot r_k) \cdot d_k^* + (\Sigma_k^* \cdot r_k)^* \cdot d_k$$

Optionally and advantageously, the magnitude $\Sigma_k$ is replaced by $S_k$, where $S_k$ is equal to:

$$S_k = \alpha \cdot S_{k-1} + r_k \cdot d_k^*$$

with $S_0=0$ and $\alpha$ equals a positive constant less than 1, or else by $S_k/(1-\alpha^k)$.

The invention also provides a receiver for signal packets that have been subjected to convolutive encoding at a transmitter, the receiver including such apparatus.

BRIEF DESCRIPTION OF THE DRAWING

Other characteristics and advantages of the invention appear on reading the following description of a preferred embodiment, given by way of non-limiting illustration, and from the accompanying drawings, in which:

FIG. 3A is a puncturing diagram of efficiency ⅔, and FIG. 3B is the corresponding depuncturing diagram;

FIG. 3C shows symbol level puncturing of efficiency ⅔ in accordance with the invention;

FIGS. 4 and 5 are graphs showing simulations performed using the method of the invention.

DETAILED DESCRIPTION OF THE INVENTION

Figure 1:
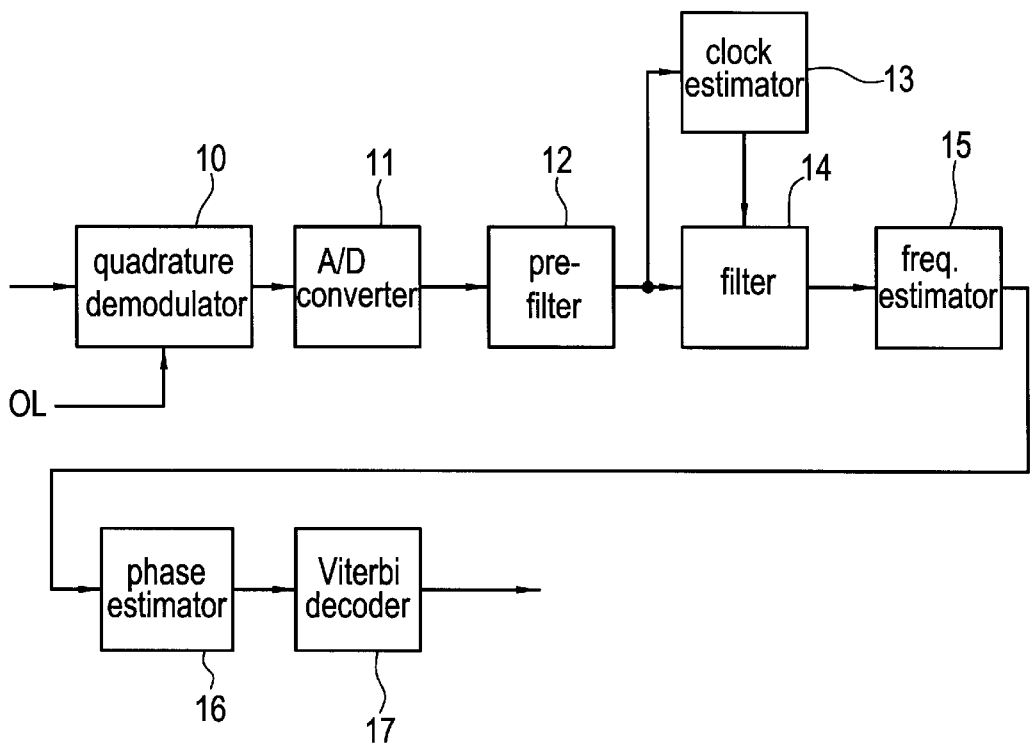
FIG. 1 is a block diagram of a known receiver system for decoding and demodulating packets encoded at a transmitter by means of a convolution code.
Figure 2:
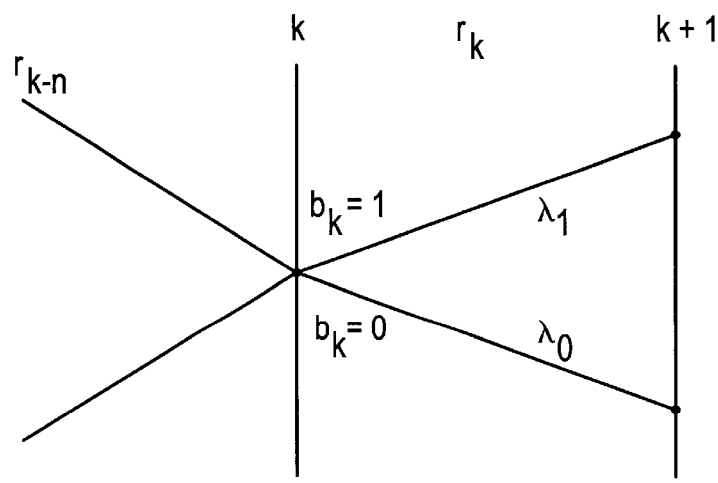
FIG. 2 shows a decision step as conventionally implemented in a Viterbi decoder.

FIGS. 1 and 2 are described above with reference to the state of the art.

The invention is based on the observation that the value of $e^{-j\phi_k}$ is equal to:

$$\frac{\Sigma_k^*}{|\Sigma_k|}$$

where $$\Sigma_k = \sum_{k=0}^{N} r_{k-n} \cdot d^*_{k-n}$$

To simplify calculation, the $$\frac{\Sigma_k^*}{|\Sigma_k|} \text{ is replaced by } \Sigma_k^* \tag{1}$$

i.e. each decision variable $r_k$ is weighted by $\Sigma_k^*$. In addition, the argument is no longer extracted, thereby obtaining a large saving in terms of calculation time.

The value of the corrected metric $\lambda_k$ is thus equal, in a simplified relationship, to:

$$\lambda_k = (\Sigma_k^* \cdot r_k) \cdot d_k^* + (\Sigma_k^* \cdot r_k)^* \cdot d_k \tag{2}$$

The invention also proposes reducing the number of symbols stored in memory by replacing the sliding window with a window having an exponential attenuation factor (forgetting factor). This window can be obtained by replacing $\Sigma_k$ with $S_k$ in the equation (2) where:

$$S_k = \alpha \cdot S_{k-1} + r_k \cdot d_k^* \quad (3)$$

with α positive and less than 1, and $S_0=0$.

For α=0.95, the window thus has a size of N=20 symbols, whereas for α=0.88, the length of the window is reduced to N=8 symbols.

In order to obtain a metric modulus that is statistically constant for decoding the first symbols of received packets, the magnitude $\Sigma_k$ is preferably replaced by $S_k/(1-\alpha^k)$ in equation (2), with $S_k$ equal to:

$$S_k = \alpha \cdot S_{k-1} + r_k \cdot d_k^* \quad (4)$$

The invention also seeks to make it possible to modify the efficiency of the code used at the transmitter: this is conventionally equal to ½ (for a truncation length of 7), and it should be possible to raise it to ⅔ for example, or more generally to l/(l+1).

FIG. 3A is a puncturing diagram having efficiency ⅔ and FIG. 3B is a corresponding depuncturing diagram.

In FIG. 3A, puncturing is applied at the transmitter to bits b0 to b9 of QPSK symbols referenced SY0 to SY4. The bits b3 and b7 of symbols SY1 and SY3 are not transmitted. At the receiver, corresponding samples $t_i$ are received and null samples replace the samples t3 and t7 so that they are not taken into account during decoding. FIG. 3B shows these null samples.

The problem raised by puncturing of this type is that the symbol SY1 can be decoded only one symbol time Ts after receiving the symbol SY1, i.e. after receiving symbol SY2. Under such circumstances, phase synchronization cannot operate. In addition, such phase synchronization depends on the puncturing performed. To solve this problem, the invention proposes puncturing at symbol level instead of puncturing at bit level, i.e. either a symbol for transmission is retained in full, or else it is eliminated.

FIG. 3C shows symbol level puncturing with efficiency ⅔.

When such puncturing is implemented in the context of the invention, prior to decoding, the receiver adds null symbols to replace the eliminated symbols.

FIGS. 4 and 5 show the results of simulations obtained for binary error rate (BER) as a function of effective Eb/No ratio, for a generator polynomial (91, 121) of constraint length k=7, efficiency R=½ and 120 symbols per packet. The values of Δf.Ts are $1.2 \times 10^{-2}$ in FIG. 4 and $10^{-3}$ in FIG. 5. The value of a is 0.88 in FIG. 4 and 0.95 in FIG. 5.

In FIG. 4, the characteristic 40 corresponds to theory and the characteristic 41 to the results obtained. In FIG. 5, the characteristic 50 corresponds to theory and the points marked correspond to the results obtained.

It can be seen that in spite of all the simplifications made (calculation simplification associated with replacement (1), metric calculated using equation (2), and applying an exponential attenuation factor to equation (4)), the results are much better than those obtained with the apparatus described with reference to FIG. 1 since departure from theory is of the order of only 0.2 dB, as compared with 1.5 dB for the above-described state of the art.

Figure 6:
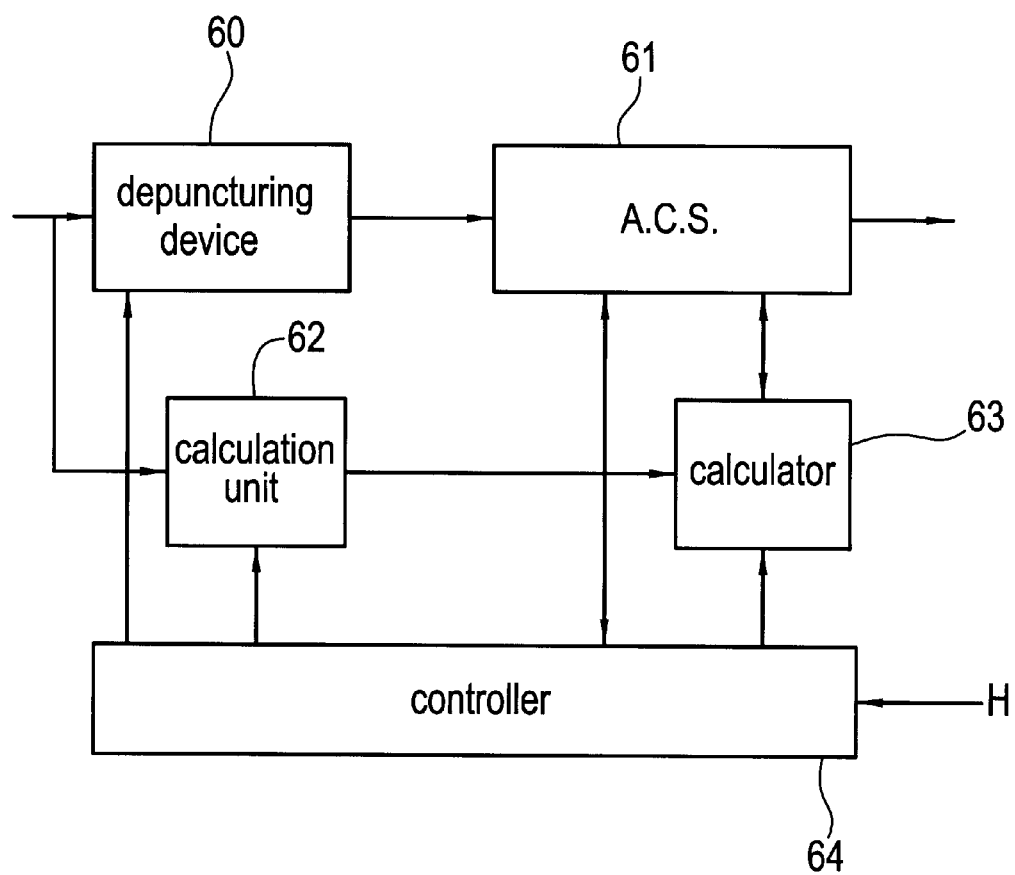
FIG. 6 is a block diagram of a receiver system in accordance with the present invention.

The invention also relates to apparatus for simultaneously phase synchronization and decoding that makes use of the maximum likelihood criterion by implementing the above-described method. An embodiment of a receiver system in accordance with the present invention is shown in FIG. 6.

Symbols in baseband are applied to a depuncturing device 60 which replaces non-transmitted symbols with null symbols. The symbols from the device 60 are applied to an add/compare/select (ACS) cell 61 outputting the decided bits. The baseband symbols are also applied to a calculation unit 62 for calculating values of $S_k$, delivering $S_k/(1-\alpha^k)$, where $S_k$ is equal to $\alpha \cdot S_{k-1} + r_k \cdot d_k^*$. A metric calculator 63 calculates the values of $\lambda_k$ by applying equation (2), optionally replacing $\Sigma_k$ by $S_k$ or by $S_k/(1-\alpha^k)$, and supplying the values of $\lambda_k$ to the ACS cell 61. A controller 64 provides initialization and first phase estimation on the single word comprising the header of each received packet. The controller 64 receives a symbol clock H.

What is claimed is:

1. A method of simultaneous phase synchronization and decoding that makes use of maximum likelihood criterion, said method being applied to signal packets received at a receiver, received signals having been subjected to convolutional encoding at a transmitter, said method comprising calculating branch metrics taking account of firm decisions calculated on received symbols and of a magnitude that takes account of phase error between the carrier of said received signal and a local oscillator signal used in said receiver, magnitude weighting decision variables, constituted by complex digital components of said received symbols, the method being characterized in that said magnitude is equal to $\Sigma_k^*$ for each of the paths studied, where:

$$\Sigma_k = \Sigma_{n=0}^{N} r_{k-n} \cdot d^*_{k-n}$$

r designating a received complex decision variable;

d designating a decoding symbol;

( )* designating the complex conjugate symbol of a complex value;

k designating the current decoded symbol; and

N the number of symbols taken into consideration.

2. A method according to claim 1, characterized in that the values of the branch metrics are:

$$\lambda_k = (\Sigma_k^* \cdot r_k) \cdot d_k^* + (\Sigma_k^* \cdot r_k)^* \cdot d_k.$$

3. A method according to claim 2, characterized in that said received symbols have been subjected to symbol level puncturing.

4. A method according to claim 3, characterized in that said puncturing has an efficiency of l/(l+1).

5. A method according to claim 1, characterized in that said magnitude $\Sigma_k$ is replaced by $S_k$ where $S_k$ is given by:

$$S_k = \alpha \cdot S_{k-1} + r_k \cdot d_k^*$$

with $S_0=0$ and a equals a positive constant less than 1.

6. A method according to claim 1, characterized in that in order to obtain a metric modulus that is statistically constant for decoding the first symbols of said received packets, said magnitude $\Sigma_k$ is replaced by $S_k/(1-\alpha^k)$, where $S_k$ is given by:

$$S_k = \alpha \cdot S_{k-1} + r_k \cdot d_k^*$$

with $S_0=0$ and α equals a positive constant less than 1.

7. A method according to claim 1, characterized in that the simultaneous phase synchronization and decoding is applied during the phase tracking stage in said receiver.

8. A method according to claim 1, characterized in that the simultaneous phase synchronization and decoding is applied during the phase acquisition stage in said receiver.

9. A method according to claim 1, characterized in that each of said packets comprises a header comprising a single word.

10. A receiver apparatus for simultaneous phase synchronization and decoding that makes use of maximum likelihood criterion, said apparatus designed to receive signal packets transmitted by a transmitter, received signals having been subjected to convolutional encoding at said transmitter, said apparatus comprising means for calculating branch metrics taking account of firm decisions calculated on the received signals and of a magnitude taking account of a phase error between the carrier of said received signal and a local oscillator signal used at said receiver, magnitude weighting decision variables constituted by the complex digital components of received symbols, the apparatus being characterized in that said magnitude is equal to $\Sigma_k^*$ for each of the paths studied, where:

$$\Sigma_k = \Sigma_{n=-N}^{N} r_{k-n} \cdot d^*_{k-n}$$

r designating a received complex decision variable;

d designating a decoding symbol;

( )* designating the complex conjugate symbol of a complex value;

k designating the current decoded symbol; and

N the number of symbols taken into consideration.

11. Apparatus according to claim 10, characterized in that it includes means for calculating the values of the branch metrics, supplying:

$$\lambda_k = (\Sigma_k^* \cdot r_k) \cdot d_k^* + (\Sigma_k^* \cdot r_k)^* \cdot d_k.$$

12. Apparatus according to claim 10, characterized in that it includes means for replacing said magnitude $\Sigma_k$ with $S_k$, where $S_k$ is given by:

$$S_k = \alpha \cdot S_{k-1} + r_k \cdot d_k^*$$

with $S_0 = 0$ and a equals a positive constant less than 1.

13. Apparatus according to claim 10, characterized in that in order to obtain a metric modulus that is statistically constant for decoding the first symbols of said received packets, said apparatus includes means for replacing said magnitude $\Sigma_k$ with $S_k/(1-\alpha^k)$, where $S_k$ is given by:

$$S_k = \alpha \cdot S_{k-1} + r_k d_k^*$$

with $S_0 = 0$ and $\alpha$ equals a positive constant less than 1.

14. Apparatus according to claim 10, characterized in that said received symbols are subjected to puncturing at symbol level.

15. A receiver of signal packets that have been subjected to convolution encoding at a transmitter, the receiver being characterized in that it includes apparatus according to claim 10.

* * * * *